US006983067B2

(12) United States Patent
Cox

(10) Patent No.: US 6,983,067 B2
(45) Date of Patent: Jan. 3, 2006

(54) TESTING AN IMAGE DISPLAY DEVICE

(75) Inventor: Andrew Cox, Surrey (GB)

(73) Assignee: Nokia Corporation, Espoo (FI)

( * ) Notice: Subject to any disclaimer, the term of this patent is extended or adjusted under 35 U.S.C. 154(b) by 552 days.

(21) Appl. No.: 10/020,586

(22) Filed: Oct. 29, 2001

(65) Prior Publication Data

US 2002/0157033 A1 Oct. 24, 2002

(30) Foreign Application Priority Data

Nov. 1, 2000 (GB) .................................... 0026726

(51) Int. Cl.
*G06K 9/00* (2006.01)

(52) U.S. Cl. ....................... 382/145; 382/172; 382/275; 345/55; 324/770

(58) Field of Classification Search ................ 382/141, 382/145, 149, 172, 181, 220, 228, 275, 305, 382/313; 341/87, 145, 118, 55; 345/418, 345/213, 440, 55; 379/219, 229; 324/601, 324/770, 765
See application file for complete search history.

(56) References Cited

U.S. PATENT DOCUMENTS 4,870,357 A 9/1989 Young et al. ............... 324/770
5,081,687 A 1/1992 Henley et al. .............. 382/141
5,175,772 A 12/1992 Kahn et al. ................. 382/141
5,293,178 A 3/1994 Kobayashi .................... 345/87
5,309,108 A * 5/1994 Maeda et al. ............... 324/501
5,365,034 A * 11/1994 Kawamura et al. ..... 219/121.83
5,576,730 A * 11/1996 Shimada et al. .............. 345/98
5,740,272 A * 4/1998 Shimada ..................... 382/149
5,764,209 A * 6/1998 Hawthorne et al. ........... 345/87
5,917,935 A * 6/1999 Hawthorne et al. ......... 382/149
6,221,543 B1 * 4/2001 Guehler et al. ................ 430/7

FOREIGN PATENT DOCUMENTS

JP 11095182 4/1999

* cited by examiner

*Primary Examiner*—Kanjibhai Patel
*Assistant Examiner*—Sheela Chawan
(74) *Attorney, Agent, or Firm*—Alfred A. Fressola; Ware, Fressola, Van Der Sluys & Adolphson

(57) ABSTRACT

A method of testing functionality of a LCD device (5) in a mobile telephone handset (MS1), involves applying first and second test patterns to electrodes (17, 18) of the device (5) and capturing image data corresponding to the display produced, using a camera (11). A processor (12) compares the image data for the first and second test patterns, for each display element of the device (5). The first and second patterns are arranged so that each element is switched on and off. When the data from the first and second patterns is compared, functional elements provide relatively high value resultant data (r), whereas non-functional data do not. The resultant data (r) is summed by row and column and compared with a threshold to detect fault conditions.

19 Claims, 4 Drawing Sheets

TESTING AN IMAGE DISPLAY DEVICE

FIELD OF THE INVENTION

This invention relates to testing an image display device and has particular but not exclusive application to testing a liquid crystal display (LCD) device when installed in electronic apparatus such as a mobile telephone handset.

BACKGROUND

Conventional mobile telephone handsets include a keypad and an LCD display device which are provided with internal back lighting which is switched on for a period when the keys are operated. During manufacture, the mobile telephone handset undergoes a functional test to determine that the LCD display device operates satisfactorily.

The functional testing involves applying test signals to the handset from an external test signal generator, which causes the LCD device to be switched on. An electronic image capture device is used to record an image of the handset under test and the resulting image is processed according to a highly complex analytical technique to determine whether the LCD is functional. Analysis of the captured image is complex due to the fact that the LCD is subject to back and other spurious lighting that varies in a non-linear manner across its display area.

The present invention seeks to provide an improved, simpler approach.

SUMMARY OF THE INVENTION

According to the invention there is provided a method of testing functionality of an image display device that comprises a matrix of image elements that are individually energisable in a graphical display, the method comprising capturing data corresponding to first and second images of the display provided by the device under different test conditions thereof, and utilising the image data for the first and second images to identify a malfunction of the device.

According to the invention, malfunctions can be identified simply and effectively from the data for the first and second images.

The elements of the display device may be energised and de-energised individually to produce the data corresponding to the first and second images such that elements energised for the first image data capture are de-energised for capturing the second image data.

The data corresponding to the first image may be captured when all of the image elements are energised with the data corresponding to the second image being captured when none of the image elements are energised.

Alternatively the data corresponding to the first and second images may be captured when alternate ones of the matrix of image elements are energised and de-energised and such that elements energised for the first image data capture are de-energised for capturing the second image data. Other energisation patterns for the elements may be used in accordance with the invention.

The image data for the first and second images may be compared e.g. by subtraction to derive resultant data corresponding to the functionality of the elements individually and the resultant data may be combined e.g. by summation, for at least a part of an individual one of rows or columns of the elements. The combined data may then be compared with a threshold to provide an indication of a malfunction in the device.

The value of the threshold may be determined as a function of the resultant data, for example a weighted combination of the mean and standard deviation of the values of the resultant data included within the individual row or column or part thereof.

The display device may comprise a liquid crystal display device and image data may be captured with an electronic camera.

The display device may have a back light operable to illuminate the display device, and the method may include capturing the data corresponding to the first and second images with the back light in use, although external illumination may be used for this purpose.

The invention also provides apparatus for testing functionality of an image display device that comprises a matrix of image elements that are individually energisable in a graphical display, the apparatus comprising an optical image capture device configured to capture data corresponding to first and second images of the display provided by the device under different test conditions thereof, and a processor configured to utilise the image data for the first and second images to identify a malfunction of the device.

The invention also includes a computer program operable to cause the image data for the first and second images to be compared so as to identify a malfunction of the device.

The program may be configured to cause the processor to compare the image data for the first and second images so as to provide resultant data corresponding to malfunctions occurring individually in an array of regions of the device configured in rows and columns, to combine the resultant data for at least part of an individual one of the rows or columns, and to compare the combined data with a threshold to provide an indication of a malfunction in the device.

BRIEF DESCRIPTION OF THE DRAWINGS

In order that the invention may be more fully understood an embodiment thereof will now be described with reference to the accompanying drawings, in which.

DETAILED DESCRIPTION

Figure 1:
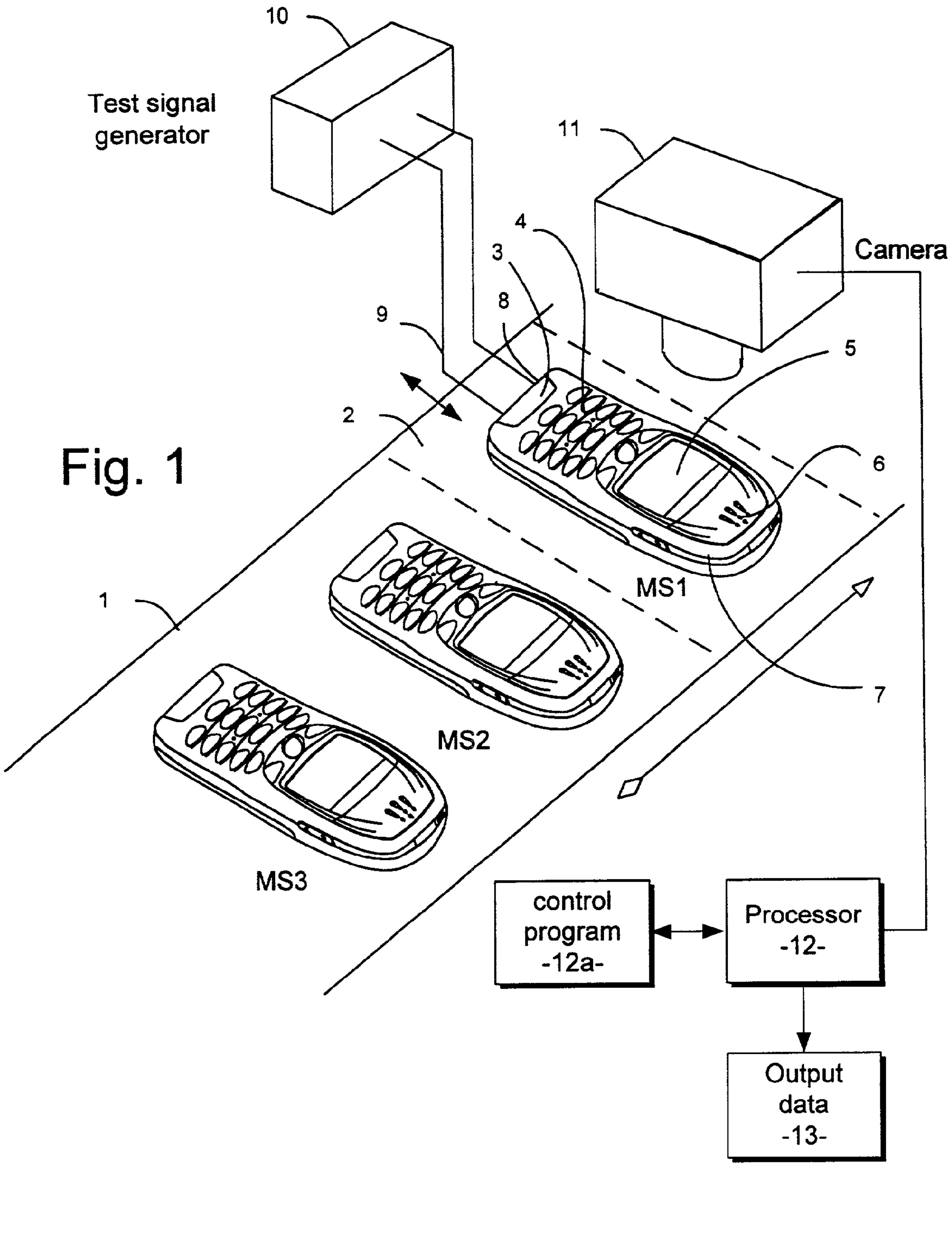
FIG. 1 is a schematic illustration of a functional testing station for mobile telephone handsets, for testing them at the time of their manufacture.

Referring to FIG. 1, mobile telephone handsets MS1, MS2, MS3 are illustrated moving along a conveyor belt 1 through a testing station 2 shown in schematically hatched outline, where functional testing is carried out at the time of manufacture of the handset.

As well known in the art, each mobile telephone handset MS 1,2,3 includes a microphone 3, keypad 4, LCD display 5, an earpiece 6 and an antenna configuration 7 which is contained within its housing. The handset also includes microprocessor controlled circuitry (not shown) which has external plug connections 8 on its underside.

When the mobile station MS moves into the testing station 2, a robot arm not shown, inserts electrical leads 9 shown schematically into the plug connection 8 so as to connect the handset to an external electrical test signal generator 10. When the testing is completed, the robot arm removes the leads 9 and the conveyor belt 1 moves so as to bring the next handset MS into the testing station 2.

Amongst other things, the test signal generator 10 carries out a functional test of the back lighting for the keypad 4 and the LCD device 5. As part of this process, the LCD device 5 is energised to ensure that it is operating correctly, as will be explained in detail.

An analogue or digital camera 11 captures image data concerning the display provided by the device 5 in the handset under test and the data are supplied to a processor 12 having an associated control program 12*a* which provides an output 13 which indicates whether the handset has passed or failed the functional testing. Preferably the camera 11 has sufficient resolution to give at least four camera image pixels for each pixel of the LCD 5, in the capture image data.

Figure 2:
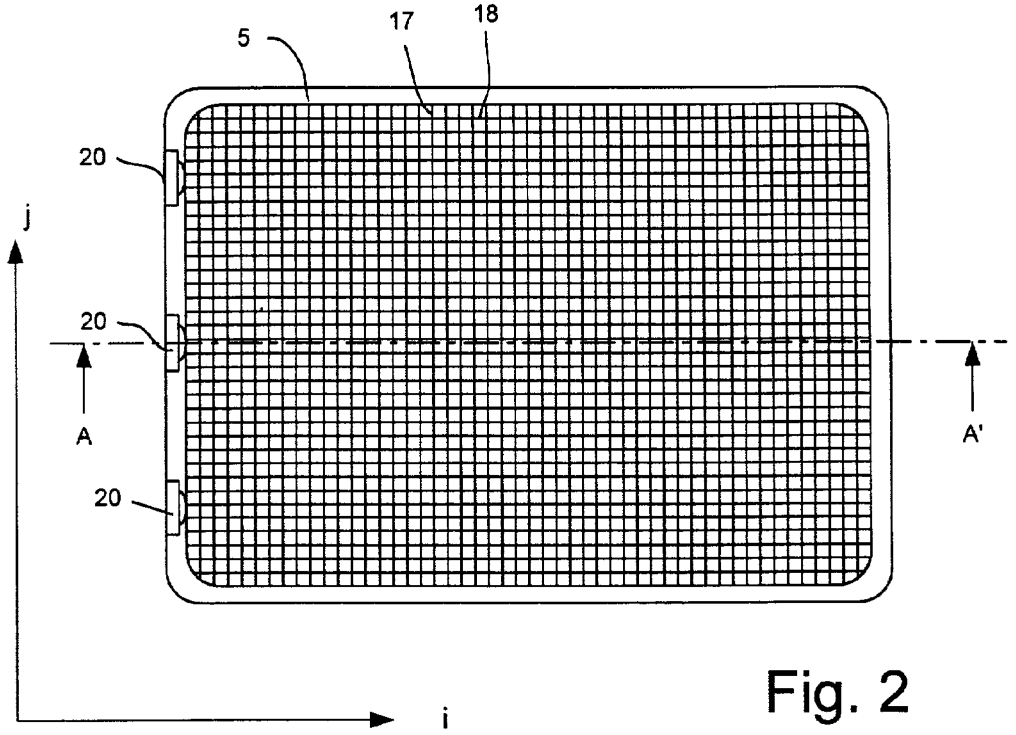
FIG. 2 is a schematic plan view of a mobile telephone handset LCD display device showing its matrix of electrodes.
Figure 4:
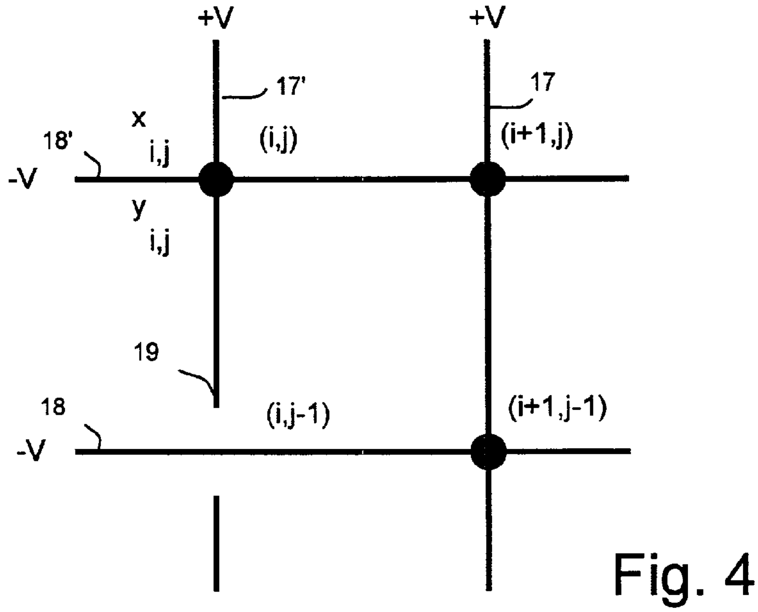
FIG. 4 is an enlarged, schematic view of the electrode arrangement shown in FIG. 2.
Figure 3:
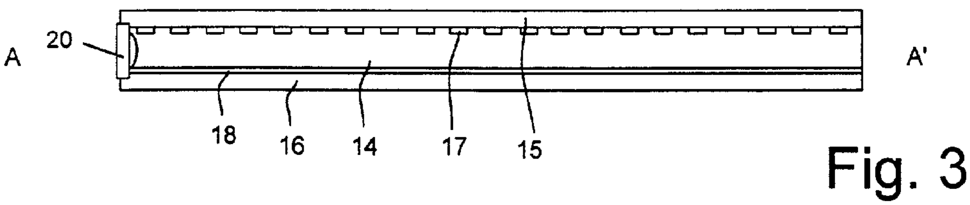
FIG. 3 is a schematic sectional view taken along the line A–A' of FIG. 2.

The LCD 5 is shown in more detail in FIGS. 2 and 3. As well known in the art, a liquid crystal display device comprises liquid crystal material 14 sandwiched between transparent plates 15,16 typically made of glass, on which arrays of parallel electrodes are formed. Electrodes 17 on plate 15 extend orthogonally of electrodes 18 formed on plate 16. The electrodes 17,18 typically comprise metalisation strips which are formed by selective etching from a metallic layer deposited onto the glass plates 15,16. As well known in the art, elemental display areas are defined at the regions where the orthogonally disposed electrodes 17,18 cross over. FIG. 4 illustrates an enlarged plan view of a portion of the electrode configuration and it can be seen that when electrodes 17',18' are energised, i.e. each receive an energisation voltage +/−V respectively, the optical characteristics of the liquid crystal material between them changes such that the display becomes opaque rather than translucent. Energisation of only one of the electrodes 17 or 18 does not produce a change in opacity. Thus, by selectively energising electrode pairs, such as electrodes 17'18', a display can be provided selectively at the element defined by the crossover of electrodes as viewed in FIG. 4.

The elemental display areas or pixels can be defined in terms of a Cartesian co-ordinate system i,j as shown in FIG. 2. Referring to FIG. 4, pixel positions (i,j); (i+1,j); (i,j−1) and (i+1,j−1) are shown.

Sometimes during manufacture, the metalisation layers 17,18 are imperfectly formed and may include a discontinuity 19 as illustrated in FIG. 4 in relation to electrode 17'. This renders pixels lying along the electrode 17' inoperable where the electrode 17' is cut off from its voltage supply V. Thus, in the example shown in FIG. 4, the pixel i,j will be operable whereas pixel i,j−1 will not operate due to the discontinuity 19. It will also be understood that pixels may not operate due to other failures in the manufacturing process, e.g. a bad electrical connection to the electrodes 17,18.

The testing carried out at testing station 2 determines whether the pixels of the display device are operating satisfactorily. The test signal generator 10 applies first and second test signals to the electrodes 17,18 such as to provide first and second test signal patterns sequentially. For each pixel, the test signal patterns are arranged so that the pixel is switched on in one of the test patterns and off in the other test pattern. For example, in the first test pattern all of the pixels may be switched on and then all of them may be switched off in the subsequent, second pattern. However, many other different test patterns can be used. For example, next adjacent pixels may be switched on and off in the first pattern, such that the pixel that is switched on in the first pattern is switched off in the second pattern and vice versa.

Each handset MS1,2,3 is provided with internal back-lighting or is externally lit in order to illuminate the LCD device 5. As shown in FIG. 2, the back-lighting is provided by light emitting diodes 20 which are typically arranged along at least one side edge of the display device 5 so as to shine light transversely into the display device between the glass plates 15,16.

In use, the camera 11 captures first image data corresponding to the first test signal pattern produced by the generator 10. The camera 11 subsequently produces second image data corresponding to the second test signal pattern. The first and second image data are subtracted in order to identify any non functional pixels of the display device 5.

Referring to FIG. 4, at the pixel location i,j, the camera 11 captures an image intensity value $x_{i,j}$ for the first test pattern of signal generator 10. The image data x is for example a quantized value between 0–255.

For the second test pattern from generator 10, the camera 11 detects corresponding image data $y_{i,j}$.

As previously explained, the pixel at location i,j is switched on for one of the test signal patterns and is switched off for the other test pattern. If the pixel is functioning correctly, the values of x and y will differ substantially from one another, whereas if the pixel does not operate, the values will be substantially the same. The processor 12 computes the resultant data r corresponding to the absolute difference between the values of x and y for each pixel, where:

$$r_{i,j}=abs(x_{I,j}-y_{I,j}) \qquad (1)$$

Figure 5:
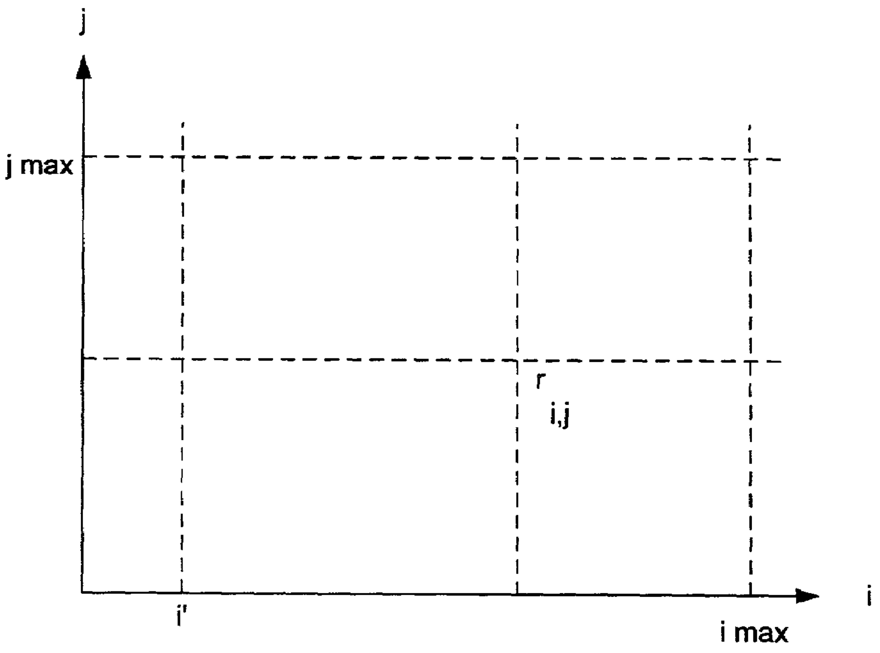
FIG. 5 is a schematic diagram of a matrix of image data derived by the image capture process.

The processor 12 computes the value of $r_{i,j}$ for all the pixels in the captured image. A map of the resulting data is shown in FIG. 5, in the i,j plane. It is will be understood that the value of $r_{i,j}$ will be relatively large for a fully functional element (i, j) of the device, and relatively low if the element is faulty. For a faulty element, the data $x_{i,j}$ and $y_{i,j}$ for the first and second captured images will be constituted by static data i.e. data which does not change substantially between the capturing of the first and second images, the static data being determined by the level of illumination from the back lights 20 or the external source. The value of the static data will vary from element to element in a non-linear manner due to the non-linear illumination and other factors. Nevertheless, such static data is cancelled out when the resultant $r_{i,j}$ is computed.

Next, the processor 12 computes a summation of the resultant values $r_{i,j}$ for each column of pixels i, i.e. between 0 and $j_{max}$ shown in FIG. 5. The resultant sum $\upsilon_i$ is given as follows:

$$v_i = \sum_{j=0}^{j_{max}} r_i, j \qquad (2)$$

Figure 6:
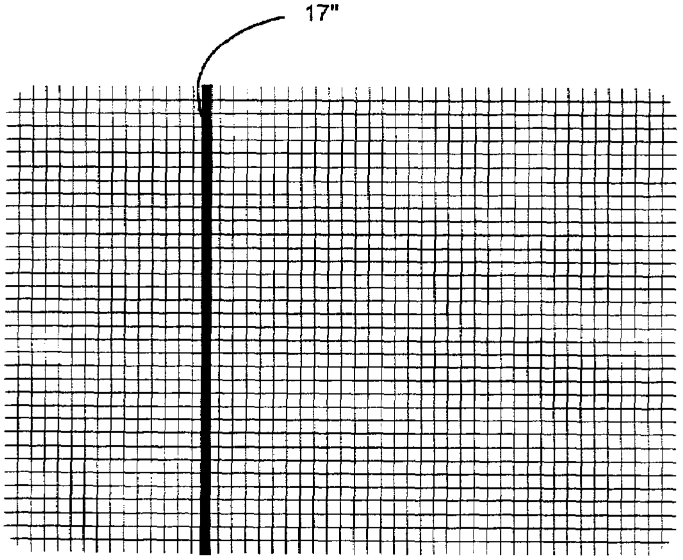
FIG. 6 is a schematic illustration of an LCD with a line failure in one of its vertically extending electrodes.
Figure 7:
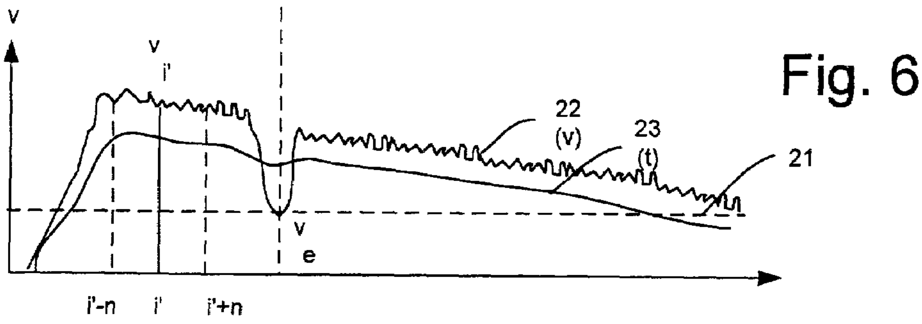
FIG. 7 is a schematic illustration of summation graphs for the vertical columns of image data derived from the image capture process for the device of FIG. 6, together with a graph of a variable threshold

FIG. 6 illustrates an LCD device 5 in which the column of pixels corresponding to electrode 17' has failed. FIG. 7 is a graph of the corresponding summation values $\upsilon_i$ for the columns i across the display and it can be seen that there is an abnormally low value of $\upsilon_e$ corresponding to a location of electrode 17", which includes a fault.

Thus, it is possible to detect manufacturing process faults by comparing the value of $\upsilon_i$ column by column with a reference threshold. A fault is detected if the value of $\upsilon_i$ is less than the threshold.

It is possible to compare the value of $\upsilon_i$ with a fixed threshold as illustrated by hatched line 21 in FIG. 7. However, as shown by the graph 22, in practice, some non-linearities occur. In this example, the illumination provided to the device 5 by the light emitting diodes 20 is non-linear over its display area, so that the graph 22 has a general drift downwardly towards the right of the graph. Furthermore, it will be understood that other sources of illumination will produce different general graph shapes for the graph 22 e.g. sloping downwardly to the right or other shapes. As a result, there is a risk that a fixed threshold 21 will not provide a reliable reference.

A plot 23 of an improved reference value $t_i$, which follows the general locus of plot 22 can however by computed from the mean and standard deviation of the values of $\upsilon_i$, as will now be explained. Considering the mean $\bar{\nu}$, this can be computed from n values of $\upsilon_i$ as follows:

$$\bar{v}_{i'} = \frac{1}{2n}\sum_{i=i'-n}^{i'+n-1} v_i \tag{3}$$

From FIG. 7, it will be seen that the resulting mean $\bar{\nu}_i$comprises a mean of 2n values of $\upsilon_i$ disposed symmetrically around the value $\upsilon_{i'}$.

A corresponding standard deviation a can be computed as follows:

$$\sigma_{i'} = \sqrt{\frac{1}{2n}\sum_{i=i'-n}^{i'+n-1}(v_i - \bar{v})^2} \tag{4}$$

The variable threshold $t_{i'}$ is defined by the following equation:

$$t_{i'}=k\sigma_i'+\bar{v}_i' \tag{5}$$

where k is a constant.

The resulting plot of the threshold t, namely plot 23 in FIG. 7 shows that the value of the threshold generally follows the plot of $\upsilon_i$ 22 and where the value of $\upsilon$ sharply drops as a result of an electrode malfunction, the threshold t does not commensurately drop and thus can be used as an appropriate reference to detect the malfunction.

In practice, an appropriate value of n is 21 and the constant k may be set to 0.18. However, the invention is not restricted to these particular values. Furthermore, it will be understood that the variable threshold t can be computed according to formulae other than equation (5) so long as the threshold is slowly varying relative to rapid changes in the value of $\upsilon_i$ that are associated with a failed electrode of the device 5.

In addition to the summations for the vertical columns $\upsilon_i$, a corresponding summation is carried out for each horizontal row of values $r_{i,j}$ shown in FIG. 5, as follows:

$$h_j = \sum_{i=o}^{imax} r_{i,j} \tag{6}$$

The values of $h_j$ are processed in a similar way to the vertical column values $v_i$. The corresponding threshold $t_j$ is computed based on the corresponding values of $\sigma_j$ and j where;

$$\bar{h}_j = \frac{1}{2n}\sum_{j=j'-n}^{j+n-1} h_j \tag{7}$$

$$\sigma_{j'} = \sqrt{\frac{1}{2n}\sum_{j=j'-n}^{j'+n-1}(h_j - \bar{h})2} \tag{8}$$

and:

$$t_{j'} = k\sigma_{j'} +_{j'} \tag{9}$$

Figure 8:
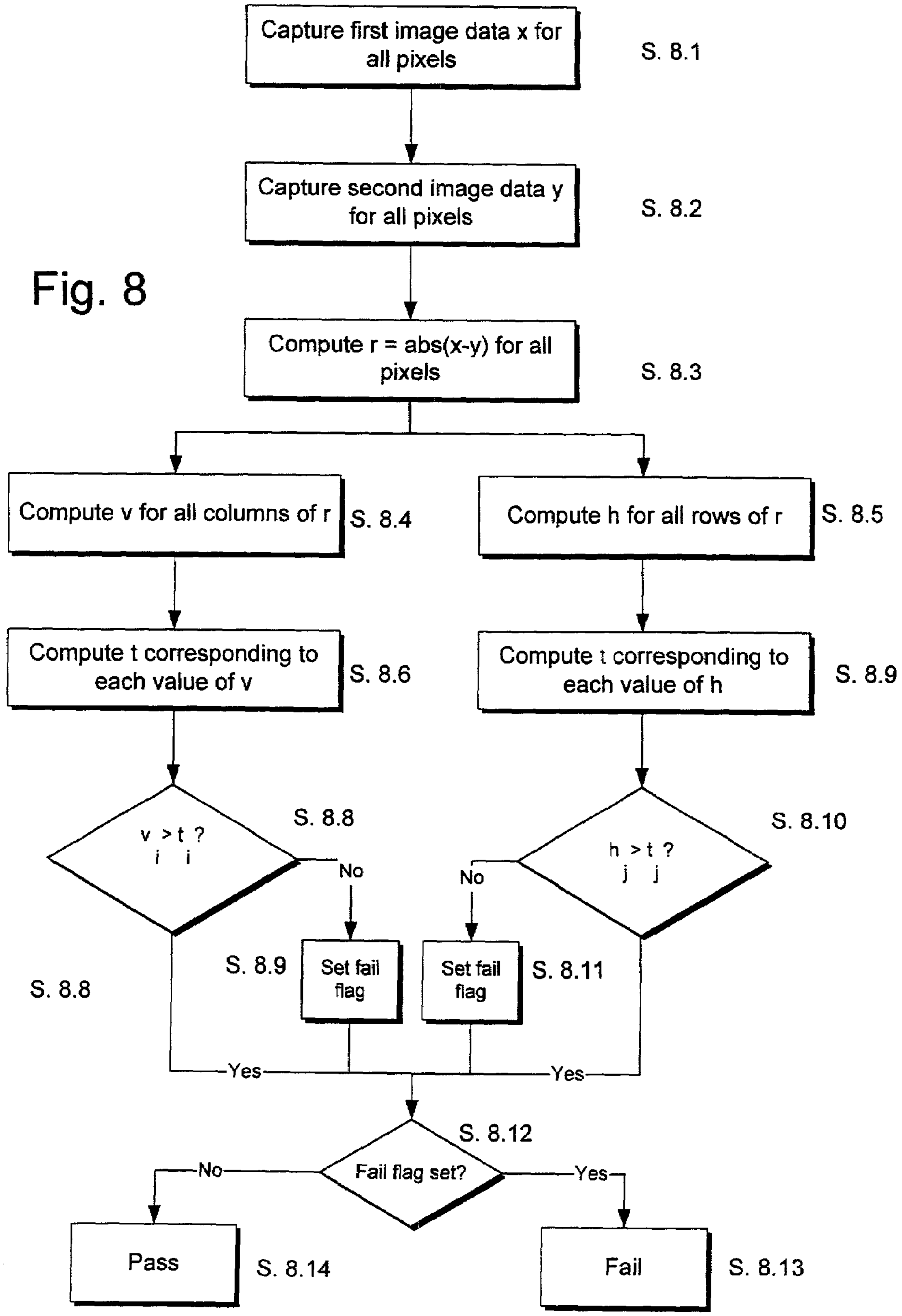
FIG. 8 is a flow chart for the LCD functional testing process.

The overall process of image capture and processing of the image data is shown schematically in FIG. 8. At step S8.1 the first test pattern is applied by the test signal generator 10 to the handset MS under test and camera 11 captures the image data corresponding to the first test pattern, i.e. $x_{i,j}$.

At step S8.2, the second test signal pattern is applied by the generator 10 to the handset and corresponding data is captured by camera 11 for the second test pattern namely data $y_{i,j}$.

At step S8.3, the data x,y are subtracted to compute $r_{i,j}$ for all pixels of the captured image, according to equation (1).

At step S8.4, the summation $\upsilon_i$ is computed for all columns of the data $r_{i,j}$ and, in step S8.5, corresponding summations $h_j$ are computed for rows of the data $r_{i,j}$.

Then, for each computed value of $\upsilon_i$, at step S8.6, a corresponding threshold $t_i$ is computed. At step S8.7, the computed threshold value $t_i$ is compared with the value of $v_i$. If the summation value $v_i$ exceeds the threshold value $t_i$, the data is considered to be satisfactory. However, if the computed value of $\upsilon_i$ does not exceed the corresponding threshold $t_i$, then, at step S8.8, a fail flag is set.

Considering the computed values of $h_i$, a corresponding threshold value $t_j$ is computed for each value of $h_j$ at step S8.9. Each value of $h_j$ is then compared with the corresponding threshold value $t_j$ at step S8.10 and if it exceeds the threshold, the data is considered to be satisfactory. Otherwise, a fail flag is set at step S8.11.

A determination is made at step S8.12 of whether the fail flag has been set at either step S8.8 or S8.11 and if so, output data is provided at step S8.13 indicating that the LCD device 5 is faulty. Otherwise, it is indicated to have satisfactorily passed the testing process at step S8.14.

Many modifications and variations fall within the scope of the invention. For example, whilst the testing is being described in relation to a mobile telephone handset it can be carried out for any item of electronic apparatus including an LCD display. Also, the display device need not necessarily be an LCD but could comprise a plasma display or other display device utilising arrayed energisation electrodes. Furthermore, the display device can be tested according to the invention separately from the apparatus into which it is eventually installed. Thus, the LCD device 5 could be tested before installation into the handset MS1. Also, different types of illumination for the display device can be used. Thus, instead of the described back-lighting, front illumination and other forms of illumination can be used as will be evident to those skilled in the art.

Typically the display device is monochrome but the invention can also be used with colour display devices.

What is claimed is:

1. A method of testing functionality of an image display device that comprises a matrix of image elements that are individually energisable in a graphical display, the method comprising capturing data corresponding to first and second images of the display provided by the device under different test conditions thereof, and utilising the image data for the first and second images to identify a malfunction of the device, wherein the utilising of the image data includes comparing the image data for the first and second images to derive resultant data corresponding to the functionality of the elements individually, and wherein the elements are configured in an array of rows and columns, and including combining the resultant data for at least a part of an individual one of the rows or columns, and comparing the combined data with a threshold to provide an indication of a malfunction in the device.

2. A method according to claim 1 including energising and de-energising the elements individually to produce the data corresponding to the first and second images such that elements energised for the first image data capture are de-energised for capturing the second image data.

3. A method according to claim 1 including capturing data corresponding to the first image when all of the image elements are energised and capturing data corresponding to the second image when none of the image elements are energised.

4. A method according to claim 1 including capturing data corresponding to the first and second images when alternate ones of the matrix of image elements are energised and de-energised and such that elements energised for the first image data capture are de-energised for capturing the second image data.

5. A method according to claim 1 wherein the value of the threshold is determined as a function of the resultant data.

6. A method according to claim 1 wherein the threshold is a weighted combination of the mean and standard deviation of the values of the resultant data included within the individual row or column.

7. A method according to claim 1 including capturing the image data with an electronic camera.

8. A method according to claim 1 wherein the display device comprises a liquid crystal display device.

9. A method according to claim 1 wherein the display device is mounted in an electronic apparatus with a back light operable to illuminate the display device, including capturing the data corresponding to the first and second images with the back light in use.

10. An apparatus for testing functionality of an image display device that comprises a matrix of image elements that are individually energisable in a graphical display, the apparatus comprising an optical image capture device configured to capture data corresponding to first and second images of the display provided by the device under different test conditions thereof, and a processor configured to utilise the image data for the first and second images to identify a malfunction of the device, wherein the processor is configured to compare the image data for the first and second images to provide resultant data corresponding to the functionality of the elements individually, wherein the elements are configured in an array of rows and columns, and the processor is configured to combine the resultant data for at least a part of an individual one of the rows or columns, and to compare the combined data with a threshold to provide an indication of a malfunction in the device for a specific row or column.

11. Apparatus according to claim 10 including a test pattern generator configured to provide first and second electrical test patterns for energising the matrix of image elements to produce said first and second images.

12. Apparatus according to claim 11 wherein the test pattern generator is configured to energise and de-energise the elements individually to produce the data corresponding to the first and second images.

13. Apparatus according to claim 11 wherein the test pattern generator is configured to energise all of the elements for the first image and to energise none of the elements for the second image.

14. Apparatus according to claim 11 wherein the test pattern generator is configured to energise and de-energise alternate ones of the matrix of image elements such that elements energised for the first image data capture are de-energised for capturing the second image data.

15. Apparatus according to claim 10 wherein the processor is operable to determine the value of the threshold as a function of the resultant data.

16. Apparatus according to claim 15 wherein the threshold is a weighted combination of the mean and standard deviation of the values of the resultant data included within the individual row or column.

17. Apparatus according to claim 10 including an electronic camera for capturing the image data.

18. A computer program stored on a computer readable medium to be run on the processor in apparatus as claimed in claim 10, the program being operable to cause the in image data for the first and second images to be compared so as to identify a malfunction of the device.

19. A program according to claim 18 configured to cause the processor to compare the image data for the first and second images so as to provide resultant data corresponding to malfunctions occurring individually in an array of regions of the device configured in rows and columns, to combine the resultant data for at least part of an individual one of the rows or columns, and to compare the combined data with a threshold to provide an indication of a malfunction in the device.

* * * * *

UNITED STATES PATENT AND TRADEMARK OFFICE

CERTIFICATE OF CORRECTION

PATENT NO. : 6,983,067 B2 Page 1 of 1
DATED : January 3, 2006
INVENTOR(S) : Andrew Cox It is certified that error appears in the above-identified patent and that said Letters Patent is hereby corrected as shown below:

<u>Column 8,</u>
Line 47, insert -- the -- after “in”.
Line 48, delete “in”.

Signed and Sealed this

Fourth Day of April, 2006

JON W. DUDAS
*Director of the United States Patent and Trademark Office*